US007989119B2

(12) United States Patent
Lee et al.

(10) Patent No.: US 7,989,119 B2
(45) Date of Patent: Aug. 2, 2011

(54) FUEL DIFFUSION UNIT, FUEL SUPPLY UNIT, AND FUEL CELL SYSTEM INCLUDING THE SAME

(75) Inventors: Jaeyong Lee, Yongin-si (KR); Lei Hu, Yongin-si (KR); Jin-ho Kim, Yongin-si (KR); Kyoung-hwan Choi, Yongin-si (KR)

(73) Assignee: Samsung SDI., Ltd., Suwon-si, Gyeonggi-do (KR)

( * ) Notice: Subject to any disclaimer, the term of this patent is extended or adjusted under 35 U.S.C. 154(b) by 32 days.

(21) Appl. No.: 12/170,830

(22) Filed: Jul. 10, 2008

(65) Prior Publication Data

US 2009/0169966 A1 Jul. 2, 2009

(30) Foreign Application Priority Data

Dec. 28, 2007 (KR) ........................ 10-2007-0140669

(51) Int. Cl.
*H01M 8/04* (2006.01)

(52) U.S. Cl. ........ 429/513; 429/514; 429/512; 429/506; 429/447; 405/51; 405/36; 405/39

(58) Field of Classification Search .................... 429/34, 429/513, 514, 512, 506, 447; 239/5, 6, 34, 239/53–56, 565; 405/36, 39, 42, 43, 44, 405/45, 47, 51
See application file for complete search history.

(56) References Cited

U.S. PATENT DOCUMENTS

| | | | | |
|---|---|---|---|---|
| 272,728 | A * | 2/1883 | Martindale | 239/201 |
| 4,721,408 | A * | 1/1988 | Hewlett | 405/48 |
| 2005/0170224 | A1* | 8/2005 | Ren et al. | 429/15 |

* cited by examiner

*Primary Examiner* — Jennifer K. Michener
*Assistant Examiner* — Heng M Chan
(74) *Attorney, Agent, or Firm* — Lee & Morse, P.C.

(57) ABSTRACT

A fuel diffusion unit including: a fuel diffusion plate; a diffusion sheet disposed on fuel diffusion plate, to evenly distribute a fuel to the fuel diffusion plate; a primary transportation unit disposed on the diffusion sheet; secondary transportation units connected to the primary transportation unit, to distribute the fuel to the fuel from the primary transportation unit to the diffusion sheet. The diffusion sheet has a wetting direction that allows the fuel to flow in a predetermined direction. The fuel diffusion unit can be included in a fuel supply unit and a fuel cell system.

19 Claims, 4 Drawing Sheets

100
110
120
A
A'
142a
142
142b
141
144
130
140

AIR
150
140
130
144b
144a
144
141
120
100
110
200

FUEL DIFFUSION UNIT, FUEL SUPPLY UNIT, AND FUEL CELL SYSTEM INCLUDING THE SAME

CROSS-REFERENCE TO RELATED APPLICATIONS

This application claims the benefit of Korean Application No. 2007-140669, filed Dec. 28, 2007, in the Korean Intellectual Property Office, the disclosure of which is incorporated herein by reference.

BACKGROUND OF THE INVENTION

1. Field of the Invention

Aspects of the present invention relate to a fuel supply unit, and more particularly, to a fuel supply unit that can vaporize a fuel, and a fuel cell system that employs the fuel supply unit.

2. Description of the Related Art

A fuel cell is an electricity generator that chemically reacts an oxidant and a fuel, to produce electricity. A fuel cell can continuously generate electricity, as long as a fuel is supplied.

A direct methanol fuel cell (DMFC) is a fuel cell that generates electricity, through a reaction between methanol supplied to an anode, and oxygen supplied to a cathode. In a DMFC, the anode and the cathode face each other across an electrolyte membrane. An assembly of the anode, the cathode, and the electrolyte membrane is conventionally referred to as a membrane and electrode assembly (MEA).

The cathode is exposed to an oxidant, such as oxygen in air. The anode is surrounded by a spacer, and vaporized methanol is supplied to the anode, through a plurality of holes formed in the spacer. Electrons are generated at the anode, and the electrons move through an electrical circuit, to the cathode. At this point, when a load is applied to the circuit, work can done using the generated electricity.

A fuel cell is generally part of a fuel cell system. A fuel cell system can be classified as an active-type, or a passive-type, according to how a fuel is supplied to an anode. In the active-type, a low concentration liquid methanol is pumped to the anode.

Passive-type fuel cell systems can include a fuel supply unit. The fuel supply unit vaporizes liquid methanol stored in a cartridge, and then the vapor is supplied to the anode, at room temperature, by diffusion. Passive-type fuel cell systems are often used in mobile devices, because passive-type fuel cell systems generally are smaller in size.

It is generally beneficial for a fuel supply system to evenly supply fuel to an entire surface of an anode. In this way, a rapid initial start-up can be realized, by uniformly supplying vaporized fuel to an MEA.

If the fuel is supplied through a single supply path, it takes time to achieve a uniform concentration of fuel across the anode. Thus, an initial start-up may be delayed. Therefore, there is a need to develop a configuration of fuel supply system that can uniformly supply fuel across an anode of an MEA, in a short time.

SUMMARY OF THE INVENTION

To address the above and/or other problems, aspects of the present invention provide a fuel diffusion unit, and a fuel supply unit, which can realize a rapid initial start-up, by uniformly supplying fuel to a membrane electrode assembly (MEA), and a fuel cell system employing the same.

According to an aspect of the present invention, there is provided a fuel diffusion unit comprising: a fuel diffusion plate; a diffusion sheet disposed on the fuel diffusion plate, to evenly distribute fuel to the fuel diffusion plate; a primary transportation unit disposed on the diffusion sheet; and secondary transportation units connected to the primary transportation unit, to distribute the fuel from the primary transportation unit to the diffusion sheet. The fuel flows through the diffusion sheet in a wetting direction of the diffusion sheet.

According to an aspect of the present invention, there is provided a fuel supply unit for a fuel cell, comprising: a fuel storage unit; a fuel diffusion plate to evaporate fuel supplied from the fuel storage unit; a diffusion sheet disposed on the fuel diffusion plate, to uniformly distribute the fuel to the fuel diffusion plate, having a wetting direction along which the fuel is distributed; a primary transportation unit disposed on the diffusion sheet, connected to the fuel storage unit; an actuator to pump the fuel through the primary transportation unit, and secondary transportation units that are connected to the primary transportation unit, to distribute the fuel to the diffusion sheet.

According to an aspect of the present invention, there is provided a fuel cell system comprising: a unit cell to generate electricity using a fuel; a fuel storage unit to store the fuel; a fuel diffusion plate to vaporize the fuel, and to supply the vaporized fuel to the unit cell; a diffusion sheet to uniformly distribute the fuel to the fuel diffusion plate, having a wetting direction along which the fuel is distributed; a primary transportation unit disposed on the diffusion sheet, and connected to the fuel storage unit; secondary transportation units connected to the primary transportation unit, to distribute the fuel to the diffusion sheet; and an actuator to pump the fuel through the primary transportation unit.

Additional aspects and/or advantages of the invention will be set forth, in part in the description which follows, and in part, will be obvious from the description, or may be learned by practice of the invention.

BRIEF DESCRIPTION OF THE DRAWINGS

These and/or other aspects and advantages of the invention will become apparent, and more readily appreciated, from the following description of the exemplary embodiments, taken in conjunction with the accompanying drawings, of which.

DETAILED DESCRIPTION

Figure 1:
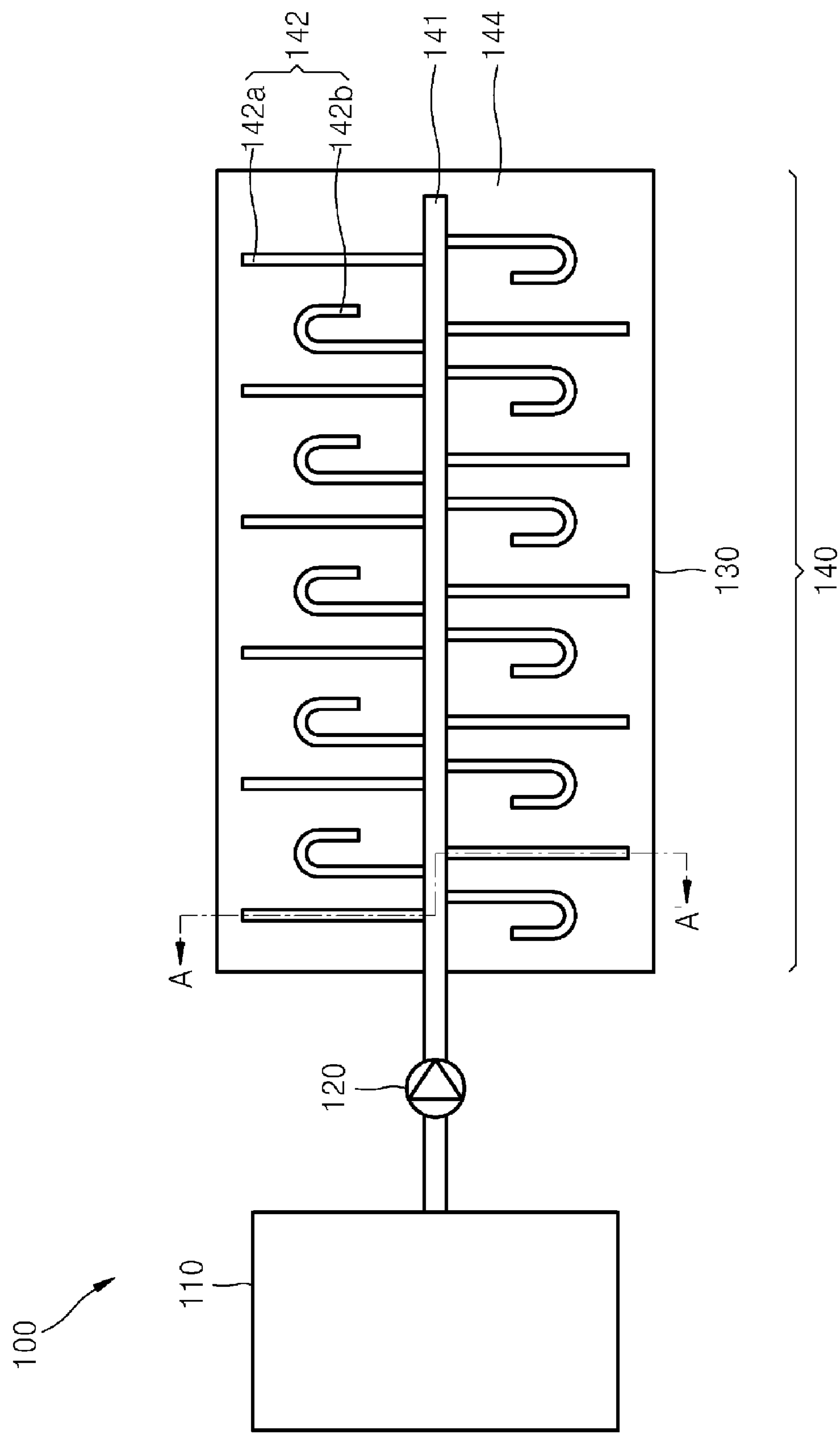
FIG. 1 is a plan view of a fuel supply unit for a fuel cell, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
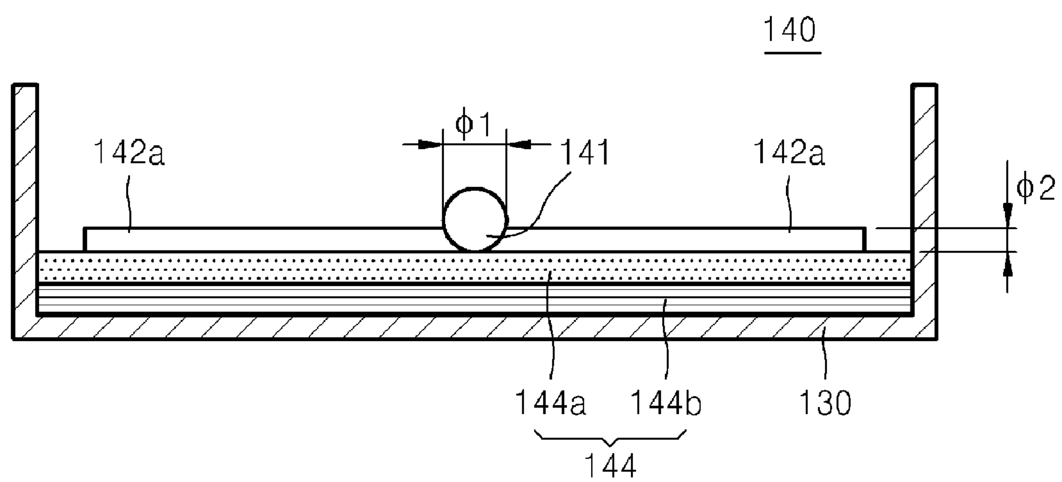
FIG. 2 is a cross-sectional view taken along line A-A of FIG. 1.

FIG. 1 is a plan view of a fuel supply unit 100 for a fuel cell, according to an exemplary embodiment of the present invention. FIG. 2 is a cross-sectional view taken along line A-A of FIG. 1, and FIG. 3 is a drawing for explaining wet directions in diffusion sheets of FIG. 2.

Figure 3:
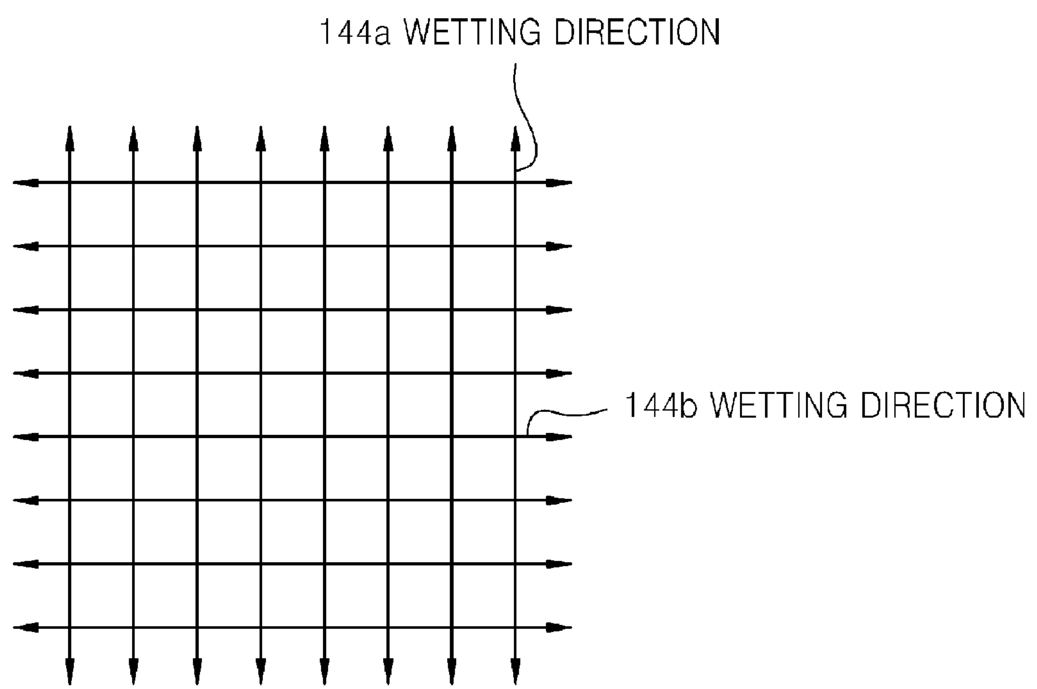
FIG. 3 is a drawing showing wetting directions in diffusion sheets of FIG. 2.

Referring to FIGS. 1 through 3, the fuel supply unit 100 includes: a fuel storage unit 110 that stores fuel; a fuel diffusion unit 140; and an actuator 120 that is connected between the fuel storage unit 110 and the fuel diffusion unit 140. The fuel is stored in the fuel storage unit 110, as a liquid. The fuel may be, for example, methanol MeOH, ethanol EtOH, or sodium boromohydride $NaBH_4$.

The fuel diffusion unit 140 includes a fuel diffusion plate 130 to vaporize the fuel, a primary transportation unit 141, secondary transportation units 142, and a diffusion sheet 144. The primary transportation unit 141 can be a tube that extends in a lengthwise direction along the center of the fuel diffusion plate 130. An end of the primary transportation unit 141 is connected to the actuator 120, and the other end is blocked. The primary transportation unit 141 may have a diameter $\phi$1, of 0.1 to 1 mm, in consideration of the portability and mobility of a mobile device in which a fuel cell is used. That is, the above range of diameters achieve a stable fuel supply to the fuel diffusion plate 130, from the fuel storage unit 110, without being significantly affected by the orientation of the primary transportation unit 141. The primary transportation unit 141 may have a larger diameter than the secondary transportation units 142.

The secondary transportation units 142 can be small tubes, such as capillaries, and can be disposed on opposing sides of the primary transportation unit 141. The secondary transportation units 142 have attached ends that are connected to the primary transportation unit 141, and open ends through which the fuel can exit the secondary transportation units 142. The attached ends can be offset from one another, along the length of the primary transportation unit 141, such that the attached ends do not face one another, across the primary transportation unit 141.

The secondary transportation units 142 include first tubes 142*a* and second tubes 142*b*. The first tubes 142*a* can be straight, such that the open ends of the first tubes 142*a* face away from the primary transportation tube 141. The second tubes 142*b* can be curved, such that the open ends of the second tubes 142*b* generally face toward the primary transportation unit 141. The first tubes 142*a* and the second tubes 142 can be alternately disposed along each side of the transportation unit 141. In other words, different types of the secondary transportation units 142 are adjacent to one other, on each side of the primary transportation unit 141.

The different secondary transportation units 142 facilitate a rapid and uniform delivery of fuel, across the entire fuel diffusion plate 130. The structures of the secondary transportation units 142 are not limited to the shapes depicted in FIG. 1. In other words, the secondary transportation units 142 can have various shapes, orientations, and/or lengths. For example, the second tubes 142*b* can be straight, and can be shorter than the first tubes 142*a*.

The secondary transportation units 142 may have increasing diameters, the further each secondary transportation unit 142 is from the actuator 120. The change in diameter facilitates a uniform supply of fuel to the entire fuel diffusion plate 130, since a fuel supply pressure decreases as a distance from the actuator 120 increases. The diameter $\phi$2 of the secondary transportation units 142 may be in a range from 5 to 250 $\mu$m.

The secondary transportation units 142 can be connected to the primary transportation unit 141, in various ways. For example, if the primary transportation unit 141 is formed from a flexible material, and the secondary transportation units 142 are formed from a harder material, the secondary transportation unit 142 can be stabbed into the primary transportation unit 141. The secondary transportation units 142 can be welded or glued to the primary transportation unit 141, for example.

The number of the secondary transportation units 142 can be determined, according to the area of the fuel diffusion plate 130. For example, if the fuel diffusion plate 130 is relatively large, the number of the secondary transportation units 142 can be increased, to increase the amount of fuel flowing there through. If the number of the secondary transportation units 142 is increased in the same area, the amount of fuel supply per unit area can also be increased. Thus, the fuel diffusion plate 130 can be more rapidly supplied with fuel, as compared to a conventional fuel diffusion plate, in which fuel is supplied through a single path, since the fuel supply unit 100 supplies the fuel simultaneously through the secondary transportation units 142.

The diffusion sheet 144 is formed to completely cover a surface of the fuel diffusion plate 130. The diffusion sheet 144 can, in some exemplary embodiments, include a first diffusion sheet 144*a* and a second diffusion sheet 144*b*. The diffusion sheet 144 may have a wetting direction. Due to the wetting direction, the diffusion sheet 144 can rapidly transport fuel from the secondary transportation units 142, to the entire surface of the fuel diffusion plate 130, by absorbing and transporting the fuel. For example, the diffusion sheet 144 can transport fuel by capillary action, wicking, or the like.

The second diffusion sheet 144*b* is positioned under the first diffusion sheet 144*a*. As depicted in FIG. 3, the first diffusion sheet 144*a* and the second diffusion sheet 144*b* have wetting directions that are different from each other. The different wetting directions, of the first diffusion sheet 144*a* and the second diffusion sheet 144*b*, facilitate the rapid distribution of fuel to the entire surface of the fuel diffusion plate 130. The wetting direction of the first diffusion sheet 144*a* may be generally perpendicular to that of the second diffusion sheet 144*b*, or may be otherwise angled from the wetting direction of the second diffusion sheet 144*b*. Accordingly, the diffusion sheet 144 can rapidly distribute fuel supplied from the secondary transportation units 142, to the entire surface of the fuel diffusion plate 130, by absorbing and transporting the fuel.

Figure 4:
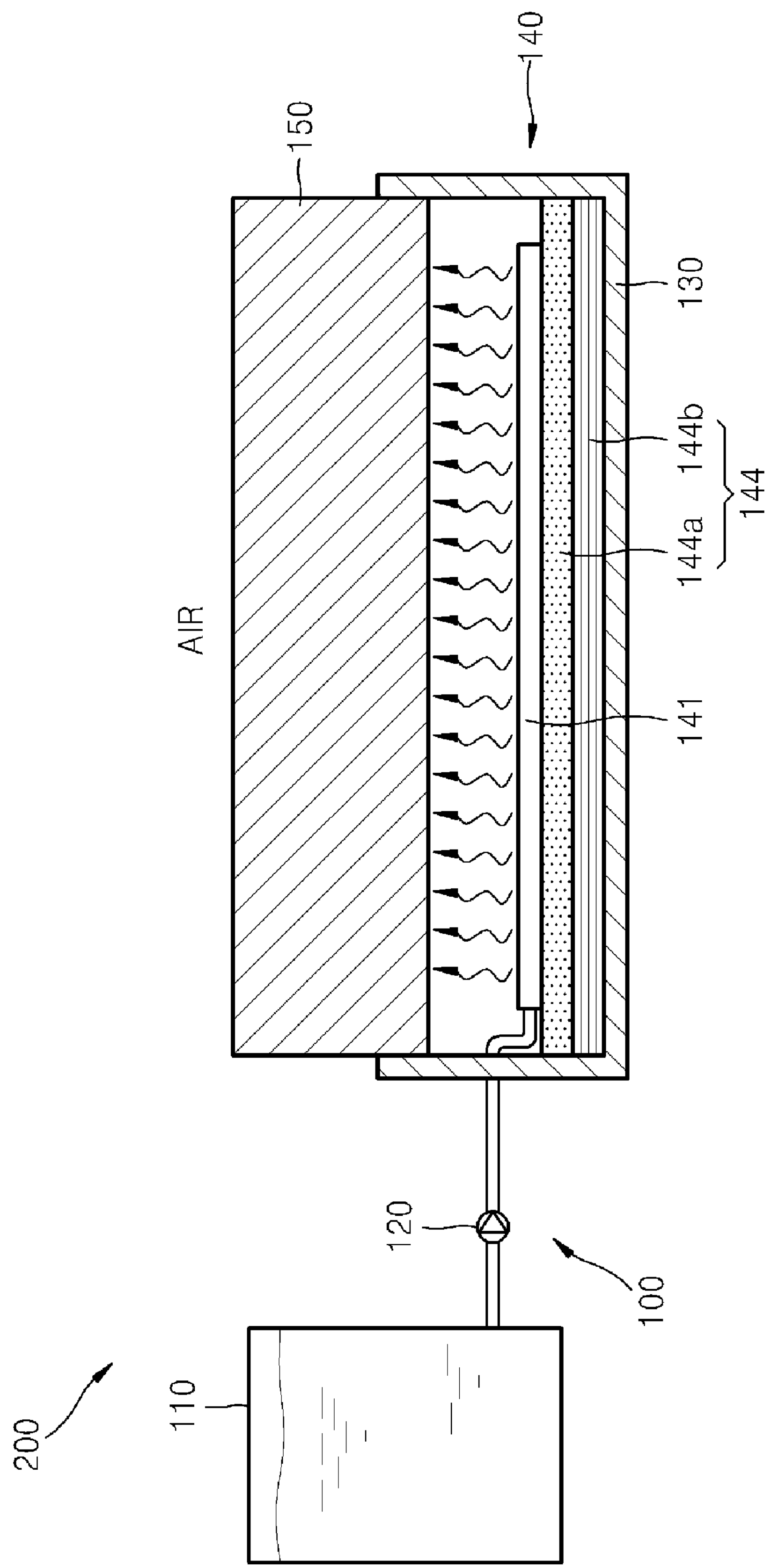
FIG. 4 is a cross-sectional view of a fuel cell system that employs the fuel supply unit of FIG. 1, according to an exemplary embodiment of the present invention.
Figure 5:
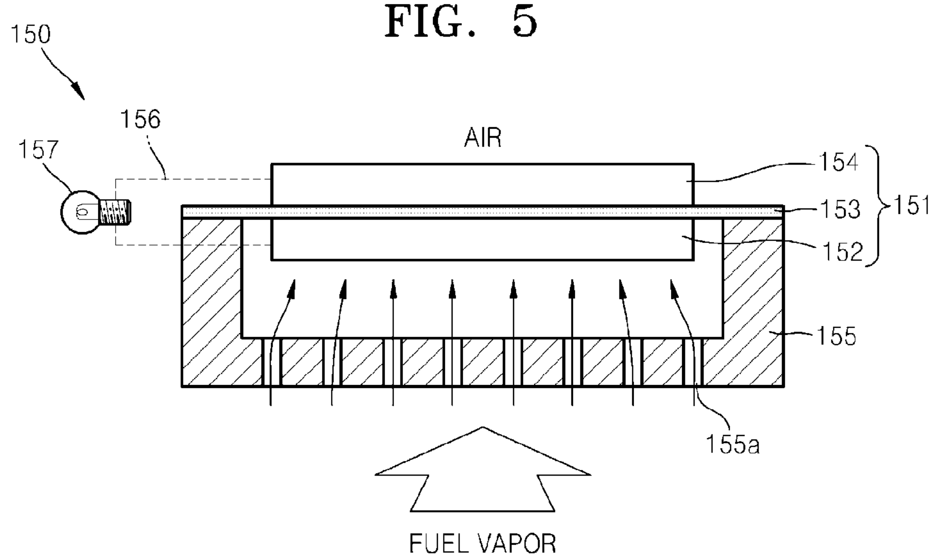
FIG. 5 is a cross-sectional view of a configuration of a cell of FIG. 4.

FIG. 4 is a cross-sectional view of a fuel cell system 200 having the fuel supply unit 100, according to an exemplary embodiment of the present invention. FIG. 5 is a cross-sectional view of a configuration of a unit cell 150, of FIG. 4. Referring to FIGS. 4 and 5, the fuel cell system 200 includes the fuel supply unit 100 of FIG. 1, and the unit cell 150, which is connected to the fuel supply unit 100, to generate a current.

The unit cell 150 includes an anode 152, a cathode 154, and an electrolyte membrane 153 interposed between the anode 152 and the cathode 154. The cathode 154 is exposed to the outside, so that the cathode 154 can be supplied with an oxygen source (air). The anode 152 is surrounded by a spacer 155. Fuel is evaporated from the fuel diffusion plate 130, and is supplied to the anode 152, through a plurality of supply holes 155*a* formed in the spacer 155.

As shown below, the Chemical Equation 1 occurs at the anode 152, to generate electrons, and the electrons move to the cathode 154, along a circuit 156, to participate in the Chemical Equation 2. A load 157 can applied to the circuit 156. An assembly of the anode 152, the cathode 154, and the electrolyte membrane 153 is conventionally referred to as a membrane and electrodes assembly (MEA).

$$CH_3OH+H_2 \rightarrow CO_2+6H^++6e^- \quad \text{[Chemical Equation 1]}$$

$$\tfrac{3}{2}O_2+6H^++6e^- \rightarrow 3H_2O \quad \text{[Chemical Equation 2]}$$

Generally, the current generated from a single unit cell 150 is not large enough to use, and thus, a plurality of the unit cells 150 are connected in a series, on the fuel diffusion plate 130. Thus, a desired voltage/current can be obtained, by using multiple unit cells 150.

Figure 6:
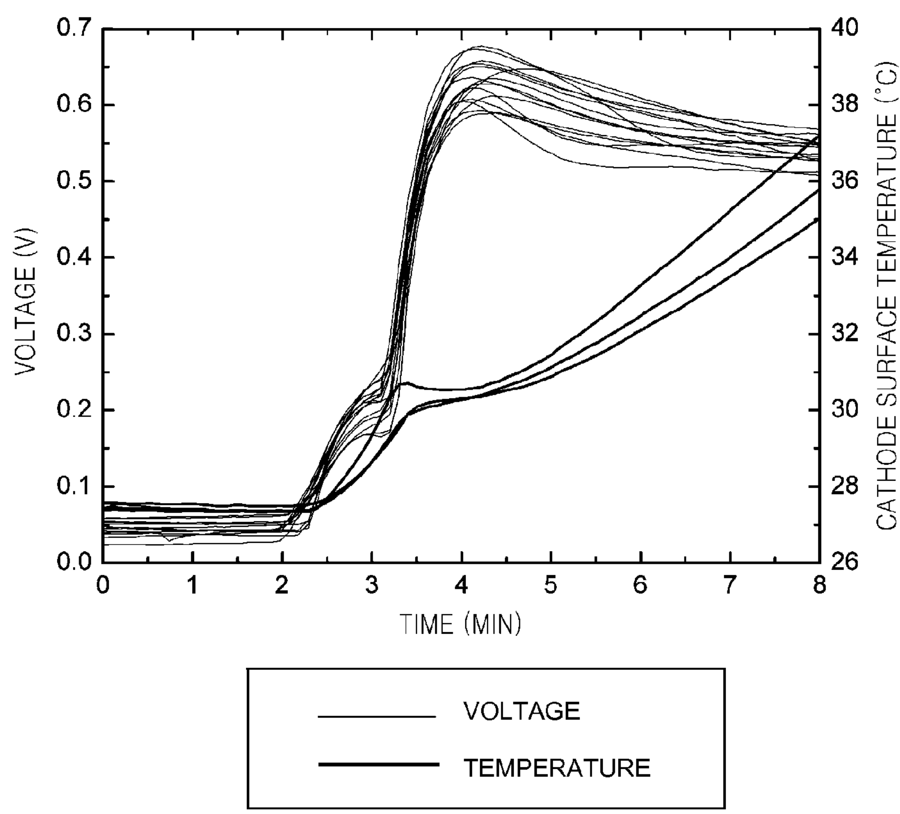
FIG. 6 is a graph showing a cell voltage, according to time and temperature measured in multiple positions of cells that use a fuel supply unit, according to an exemplary embodiment of the present invention.

FIG. 6 is a graph showing unit cell voltages, according to time, and temperatures of the unit cells, when the unit cells are supplied with fuel using the fuel supply unit 100. Referring to FIG. 6, the horizontal axis indicates time in minutes, the vertical axis on the left side indicates voltages V of the unit cells, and the vertical axis on the right side indicates cathode surface temperatures, in ° C. FIG. 6 shows the voltage increase in each of the unit cells, when sixteen unit cells are installed on the fuel diffusion plate 130 of the fuel supply unit 100.

Referring to FIG. 6, the voltages of the sixteen unit cells uniformly increase, without a large deviation. This indicates that fuel is uniformly supplied to each of the unit cells, since the voltages increase in nearly the same manner. Thus, the fuel supply unit 100 uniformly distributes fuel to the entire surface of the fuel diffusion plate 130, in a short time.

FIG. 6 also shows temperatures measured by three temperature detecting devices that are installed in three different positions. It can be said that temperature nearly uniformly rises, although there is a slight temperature deviation (approximately within 2° C.). This result denotes that the amount of fuel cross-over is similar in each of the cells, and fuel was uniformly supplied to all of the sixteen cells. Thus, it is seen that the fuel supply unit 100 uniformly distributes fuel to the entire surface of the fuel diffusion plate 130, in a short time.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A fuel diffusion unit comprising:

a fuel diffusion plate to vaporize a fuel;

a diffusion sheet to distribute a fuel across a surface of the fuel diffusion plate, having a wetting direction along which the fuel is distributed;

a primary transportation tube disposed on the diffusion sheet; and secondary transportation tubes that are independently connected to the primary transportation tube, to distribute the fuel from the primary transportation tube to the diffusion sheet, through open ends thereof, wherein:

the secondary transportation tubes include first tubes that are generally straight and second tubes that are curved in a J shape such that open ends thereof face the primary transportation tube, and the first and second tubes are alternately disposed along each of two opposing sides of the primary transportation tube.

2. The fuel diffusion unit of claim 1, wherein the primary transportation tube is a tube having a first end that is connected to a fuel storage unit, and a second end that is blocked to prevent the fuel from flowing there though.

3. The fuel diffusion unit of claim 2, wherein the primary transportation tube has a diameter of 0.1 to 1 mm.

4. The fuel diffusion unit of claim 1, wherein the secondary transportation tubes have diameters of 5 to 250 gm.

5. The fuel diffusion unit of claim 1, further comprising a plurality of the diffusion sheets that have different wetting directions.

6. A fuel supply unit for a fuel cell, comprising:

a fuel storage unit to store a fuel;

a fuel diffusion plate to vaporize the fuel;

a diffusion sheet to distribute the fuel across a surface of the fuel diffusion plate, having a wetting direction along which the fuel is distributed;

a primary transportation tube disposed on the diffusion sheet, and connected to the fuel storage unit;

an actuator to pump the fuel through the primary transportation unit; and secondary transportation tubes that are independently connected to the primary transportation tube, to distribute the fuel to the diffusion sheet through open ends thereof;

wherein:

the secondary transportation tubes include first tubes that are generally straight and second tubes that are curved in a J shape such that open ends thereof face the primary transportation tube, and the first and second tubes are alternately disposed along each of two opposing sides of the primary transportation tube.

7. The fuel supply unit of claim 6, wherein the primary transportation tube is a tube having a first end that is connected to the fuel storage unit, and a second end that is blocked to prevent the fuel from flowing there though.

8. The fuel supply unit of claim 7, wherein the primary transportation tube has a diameter of 0.1 to 1 mm.

9. The fuel supply unit of claim 6, wherein the secondary transportation tubes have a diameter of 5 to 250 μm.

10. The fuel supply unit of claim 6, further comprising a plurality of the diffusion sheets that have different wetting directions.

11. A fuel cell system comprising:

a unit cell to generate a current using a fuel;

a fuel storage unit to store the fuel;

a fuel diffusion plate to vaporize the fuel, and to supply the vaporized fuel to the unit cell;

a diffusion sheet to distribute the fuel across a surface of the fuel diffusion plate, having a wetting direction along which the fuel is distributed;

a primary transportation tube disposed on the diffusion sheet, and connected to the fuel storage unit;

an actuator to pump the fuel through the primary transportation tube; and secondary transportation tubes that are independently connected to the primary transportation tube, to distribute the fuel to the diffusion sheet through open ends thereof, wherein:

the secondary transportation tubes include first tubes that are generally straight and second tubes that are curved in a J shape such that open ends thereof face the primary transportation tube, and the first and second tubes are alternately disposed along each of two opposing sides of the primary transportation tube.

12. The fuel cell system of claim 11, wherein the primary transportation tube is a tube having a first end that is connected to the fuel storage unit, and a second end that is blocked to prevent the fuel from flowing there though.

13. The fuel cell system of claim 12, wherein the primary transportation tube has a diameter of 0.1 to 1 mm.

14. The fuel cell system of claim 11, wherein the secondary transportation tubes have a diameter of 5 to 250 μm.

15. The fuel cell system of claim 11, further comprising a plurality of the diffusion sheets that have different wetting directions.

16. The fuel diffusion unit of claim 1, wherein:

the secondary transportation tubes are spaced along a length of the primary transportation tube; and diameters of the secondary transportation tubes increase as a distance between each of the secondary transportation tubes and an actuator increases.

17. The fuel diffusion unit of claim 1, wherein the secondary transportation tubes extend away from the primary transportation tube, and are offset from one another on the opposing sides of the primary transportation tube.

18. The fuel diffusion unit of claim 1, wherein:

the first tubes have open ends that face away from the primary transportation tube.

19. The fuel diffusion unit of claim 1, wherein:

the first tubes extend away from the opposing sides of the primary transportation tube, the second tubes extend away from the opposing sides of the primary transportation tube; and the first tubes are longer than the second tubes.

* * * * *